United States Patent
Watanabe et al.

(10) Patent No.: US 6,880,169 B1
(45) Date of Patent: Apr. 12, 2005

(54) IMAGE DOWN-LOADING APPARATUS AND SYSTEM, AND IMAGE DOWN-LOADING METHOD

(75) Inventors: Ikuo Watanabe, Yokohama (JP); Yoichi Kazama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/199,740

(22) Filed: Nov. 25, 1998

(30) Foreign Application Priority Data

Nov. 27, 1997 (JP) ............................................... 9-326272
Nov. 6, 1998 (JP) ........................................... 10-316578

(51) Int. Cl.[7] .......................... H04N 7/16; H04N 5/232
(52) U.S. Cl. .......................... 725/113; 725/12; 725/42; 725/146; 348/211.3
(58) Field of Search ............................. 725/12, 42, 87, 725/92, 98, 113–116, 146, 145, 148; 348/211.1, 211.2, 211.3, 211.4, 211.14, 211.99; 709/217–219

(56) References Cited

U.S. PATENT DOCUMENTS

| 5,732,216 | A | * | 3/1998 | Houpt et al. |
| 5,740,252 | A | * | 4/1998 | Minor et al. |
| 5,796,952 | A | * | 8/1998 | Davis et al. |
| 5,923,379 | A | * | 7/1999 | Patterson |
| 5,982,362 | A | * | 11/1999 | Crater et al. ................. 345/327 |
| 6,005,561 | A | * | 12/1999 | Hawkins et al. .......... 715/500.1 |
| 6,166,729 | A | * | 12/2000 | Acosta et al. ............... 345/327 |
| 6,272,235 | B1 | * | 8/2001 | Bacus et al. ................. 382/133 |
| 6,292,827 | B1 | * | 9/2001 | Raz ............................. 709/217 |
| 6,367,080 | B1 | * | 4/2002 | Enomoto et al. |

* cited by examiner

Primary Examiner—Krista Bui
(74) Attorney, Agent, or Firm—Morgan & Finnegan, LLP (57) ABSTRACT

A switching apparatus of a camera server switches to down-load advertisement for a predetermined period at predetermined intervals while down-loading an image sensed by a camera, in response to a request for the image sensed by the camera.

51 Claims, 10 Drawing Sheets

IMAGE DOWN-LOADING APPARATUS AND SYSTEM, AND IMAGE DOWN-LOADING METHOD

BACKGROUND OF THE INVENTION

The present invention relates to an image down-loading apparatus and system, and image down-loading method for down-loading a moving image, such as a live image, to a terminal or terminals connected to a computer network via the computer network.

Conventionally, an image down-loading system for providing a live image to unspecified or specified viewers (computers) via computer networks, such as an intranet and the Internet is known. For example, a live image may be down-loaded as it is embedded in a home page or as a part of a home page of the world wide web (WWW), and the down-loaded image is displayed on a display screen of a client device.

Figure 9:
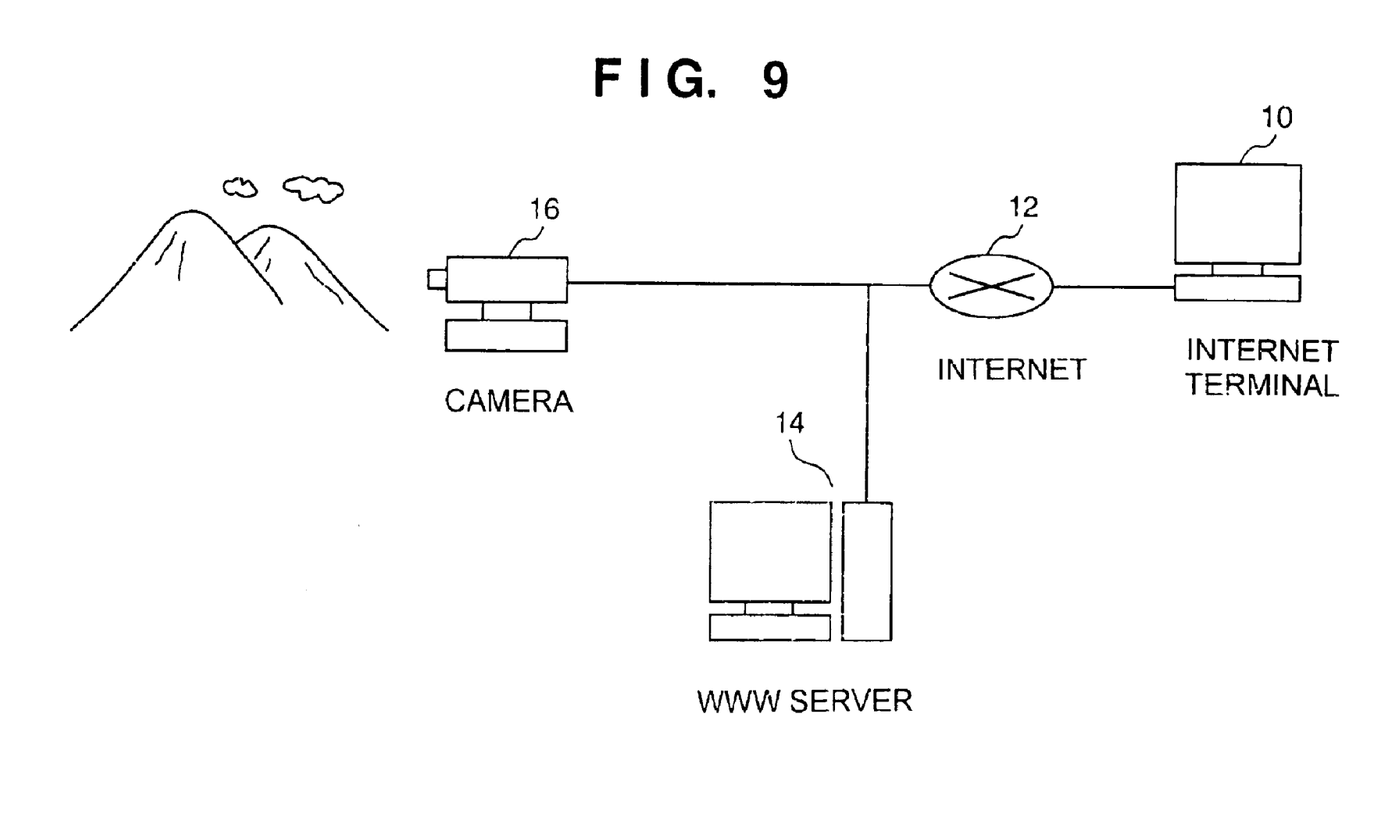
FIG. 9 is a schematic view showing a configuration of the conventional image down-loading system.

Consider a common computer network as shown in FIG. 9; an Internet terminal 10 accesses a WWW server 14 via the Internet 12, further accesses a video camera 16 linked to a home page of the WWW server 14, and requests an image sensed by the camera 16. The image sensed by the camera 16 is displayed in a browser of the terminal 10 using a plug-in, a helper-application, or a server-push technique.

Figure 10A:
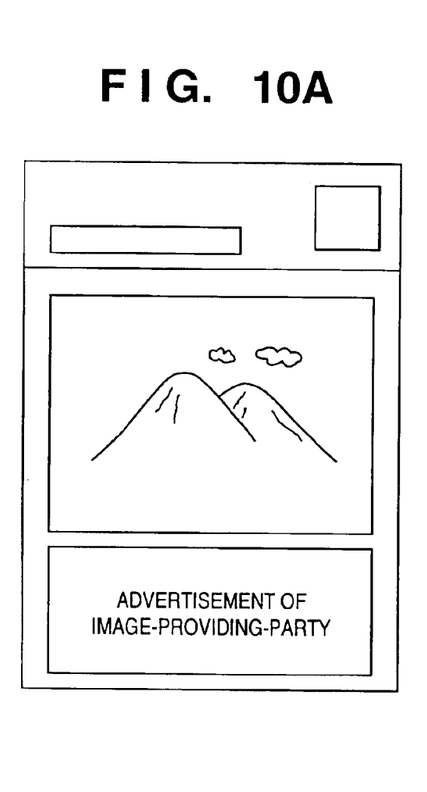
FIGS. 10A and 10B are examples of images conventionally displayed on a display screen.
Figure 10B:
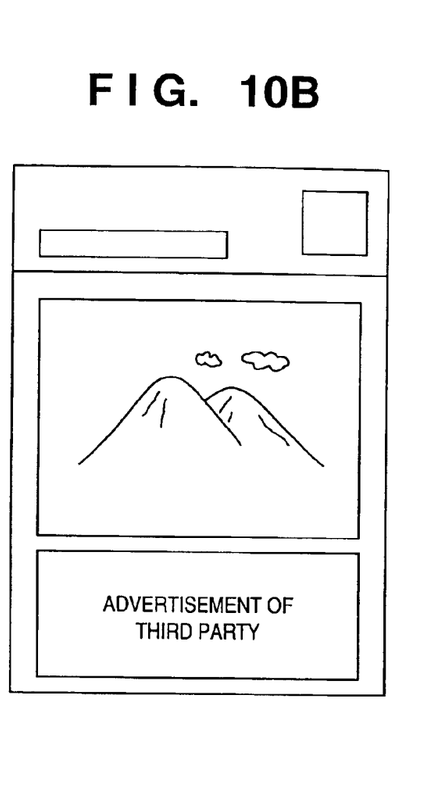

It is advantageous for an image-providing-party to display advertisement of the party together with the live image as shown in FIG. 10A; however, it is possible for the terminal 10 to obtain only the image sensed by the camera 16. Moreover, it is possible to display advertisement of a third party instead of the original advertisement along with the image as shown in FIG. 10B. In other words, there is a fear that the image sensed by the camera 16 is plagiarized.

SUMMARY OF THE INVENTION

The present invention has been made in consideration of the above situation, and has as its object to provide an image down-loading-apparatus and system, and image down-loading method capable of preventing a moving image, such as a live image, from being plagiarized.

According to the present invention, the foregoing object is attained by providing an image down-loading apparatus capable of down-loading an image to a plurality of clients via a network, comprising: first output means for outputting an image; second output means for outputting information which is independent of the image outputted by the first output means; a switch for switching between the first output means and the second output means; and a switch controller for controlling the switch, wherein the switch controller controls the switch so as to select the second output means for a first predetermined period after the first output means is selected for a second predetermined period.

Further, the foregoing object is also attained by providing an image down-loading system capable of down-loading an image to a plurality of clients via a network, comprising: first down-loading means for down-loading an image; second down-loading means for down-loading information which is independent of the image down-loaded by the first down-loading means; a switch for switching between the first down-loading means and the second down-loading means; and a switch controller for controlling the switch, wherein the switch controller controls the switch so as to select the second down-loading means for a first predetermined period after the first down-loading means is selected for a second predetermined period.

Furthermore, the foregoing object is also attained by providing an image down-loading method capable of down-loading an image to a plurality of clients via a network, comprising: a first down-loading step of down-loading loading an image; a second down-loading step of down-loading information which is independent of the image down-loaded in the first down-loading step; a first switching step of switching from the first down-loading step to the second down-loading step after a first predetermined period has elapsed; and a second switching step of switching from the second down-loading step to the first down-loading step after a second predetermined period has elapsed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
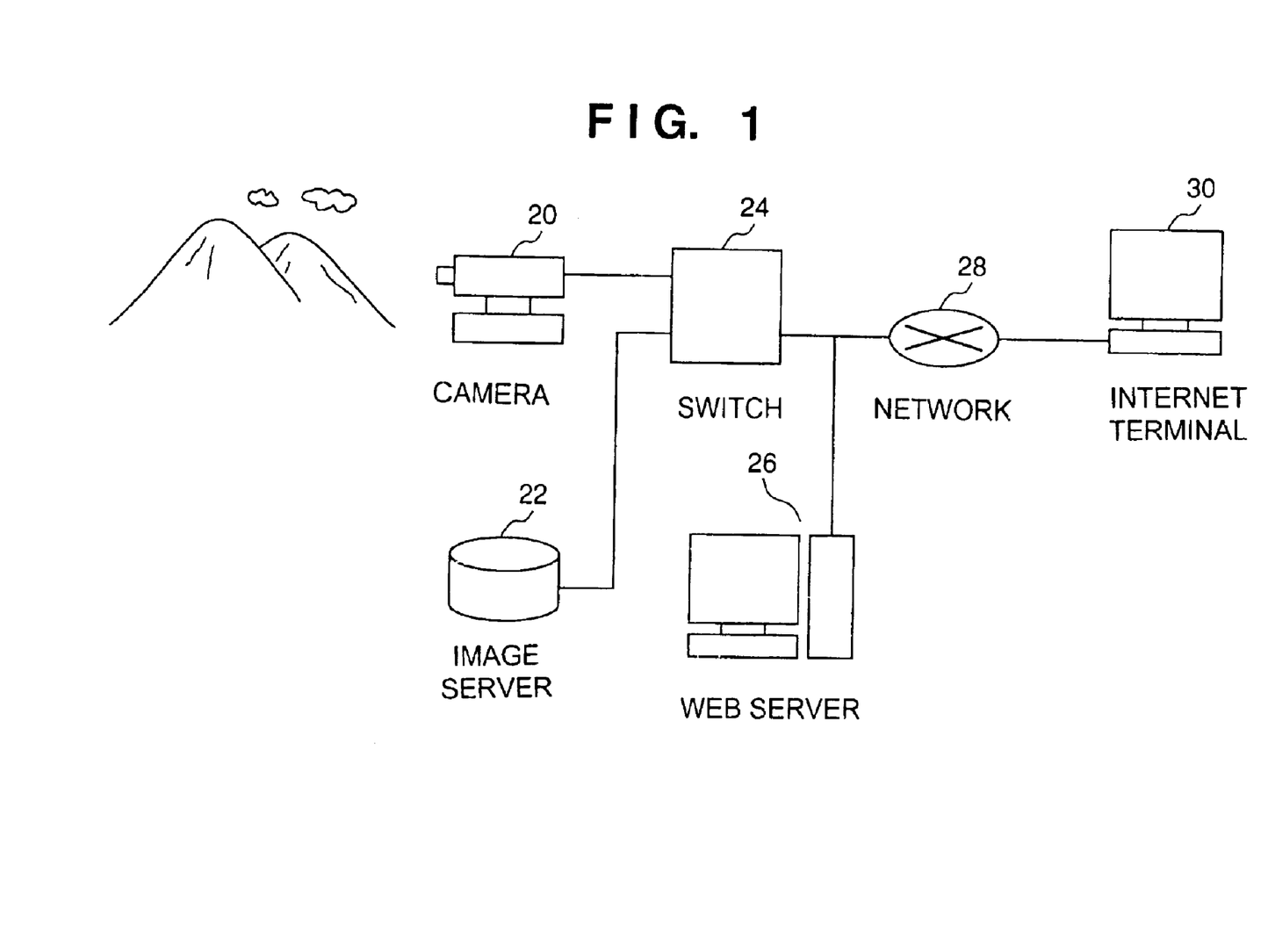
FIG. 1 is a drawing showing a brief configuration of an image down-loading system according to a first embodiment of the present invention.

FIG. 1 is a schematic view showing a brief configuration of an image down-loading system according to a first embodiment of the present invention. In FIG. 1, reference numeral 20 denotes a camera for sensing an object; 22, an image server for transmitting image information, such as advertisement; 24, a switch for switching between an output from the camera 20 and an output from the image server 22; 26, a web server; 28, a network; and 30, an Internet terminal (e.g., personal computer).

The Internet terminal 30 accesses a home page of the web server 26 via the network 28 and selecting the camera 20 in the home page. With the foregoing operation, the terminal 30 requests the web server 26 to send an image sensed by the camera 20 and receives the image. This operation is the same as the conventional operation; however, in the first embodiment, the switch 24 switches from the image outputted from the camera 20 to information from the image server 22 for a predetermined period at predetermined intervals. For instance, the switch 24 selects an image from the camera 20 for 55 seconds, then selects image information from the image server 22 for the next 5 seconds while transmitting the images over the network 28.

Figure 5:
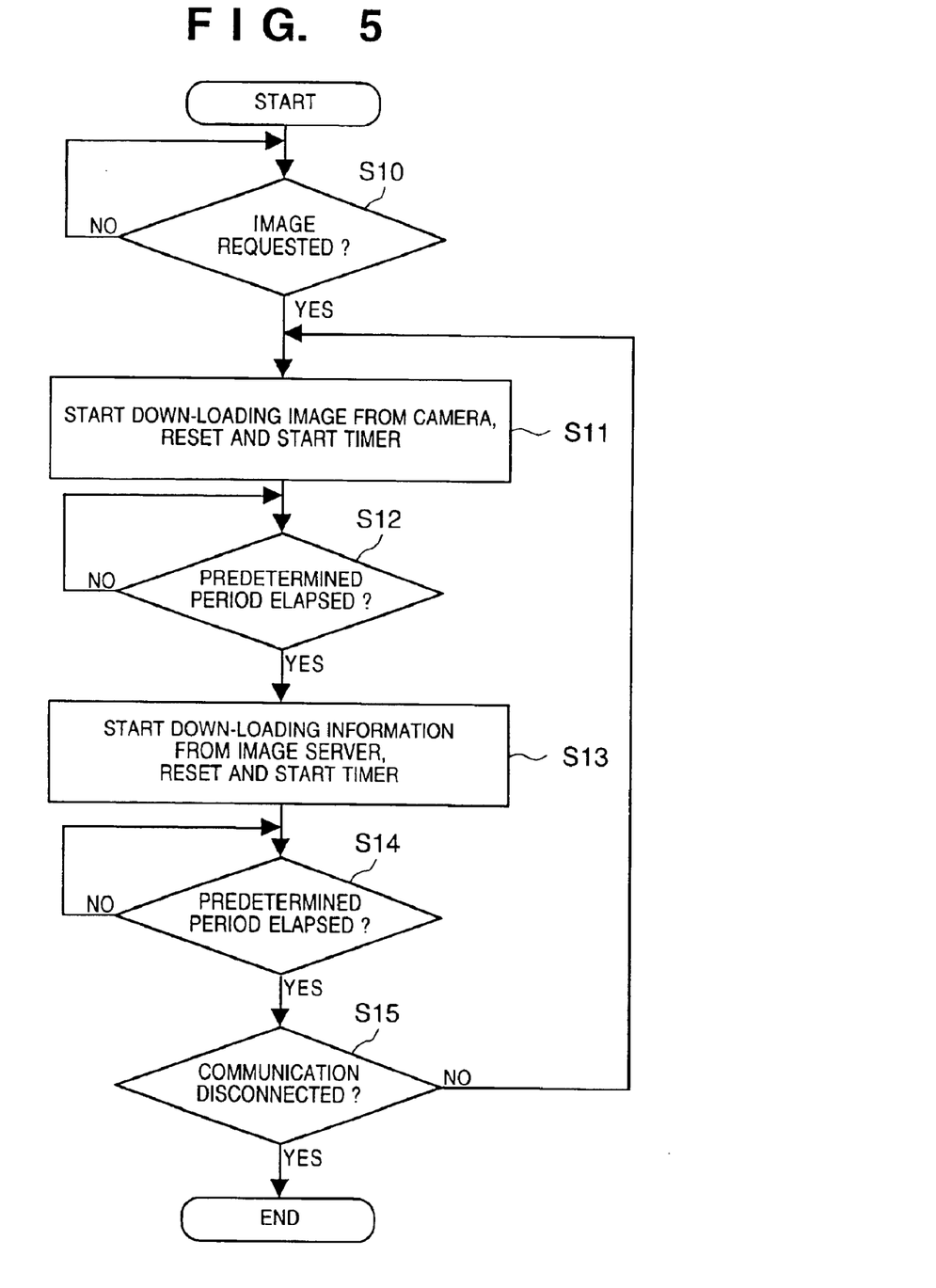
FIG. 5 is a flowchart for explaining an operation of a web server according to the first embodiment of the present invention.

Next, an operation of the web server 26 will be explained with reference to a flowchart shown in FIG. 5.

First in step S10, the web server 26 waits for a request for an image from the terminal 30. When an image is requested, the web server 26 controls the switch 24 to select the output from the camera 20 to start providing an image sensed by the camera 20 as well as resets and starts an internal timer in step S11. Then in step S12, the web server 26 waits until a predetermined period (in the above example, 55 seconds) elapses while down-loading the image. After the predetermined period elapses, then in step S13, the web server 26 controls the switch 24 to select the output from the image server 22 to start down-loading information stored in the image server 22, as well as resets and starts the internal timer. In step S14, the web server 26 ax waits until a predetermined period (in the above example, 5 seconds) elapses while down-loading the information, and after the predetermined period elapses, the process proceeds to step S15. In step S15, whether or not the communication is disconnected is determined, and if yes, the process is completed; whereas if not, the process returns to step S11 and steps S11 to S15 are repeated.

Information provided from the image server 22 may be advertisement, for instance. The content of the information transmitted from the image server 22 may be changed for each transmission, e.g., every 1 minute in the above example. It is also possible for the image server 22 to store an image sensed by the camera 20 and transmitted via the switch 24.

Further, it is possible to make advertisement, downloaded from the image server 22 at the first opportunity in the communication, be stored in the terminal 30, and subsequently, to control the terminal 30 to display the advertisement stored in the terminal 30 while the information from the image server 22 is to be down-loaded. In this manner, it is possible to reduce a traffic of the network 28.

It takes several seconds from the time terminal 30 accesses of the camera 20 (and the image server 22) until the first image is provided. Accordingly, it is possible to cause the terminal 30 to display advertisement down-loaded in the last communication during this period.

A user capable of using the Internet, for free or at a very low charge, tends to be connected or maintain transmission traffic. This often results in an unnecessary increase in traffic and additional load on a server. To cope with the problem, there is a method of disconnecting the connection or releasing the transmission traffic after a predetermined period has elapsed. In this case, it is also possible to cause the terminal 30 to display the advertisement down-loaded in the last communication after the disconnection.

Figure 2:
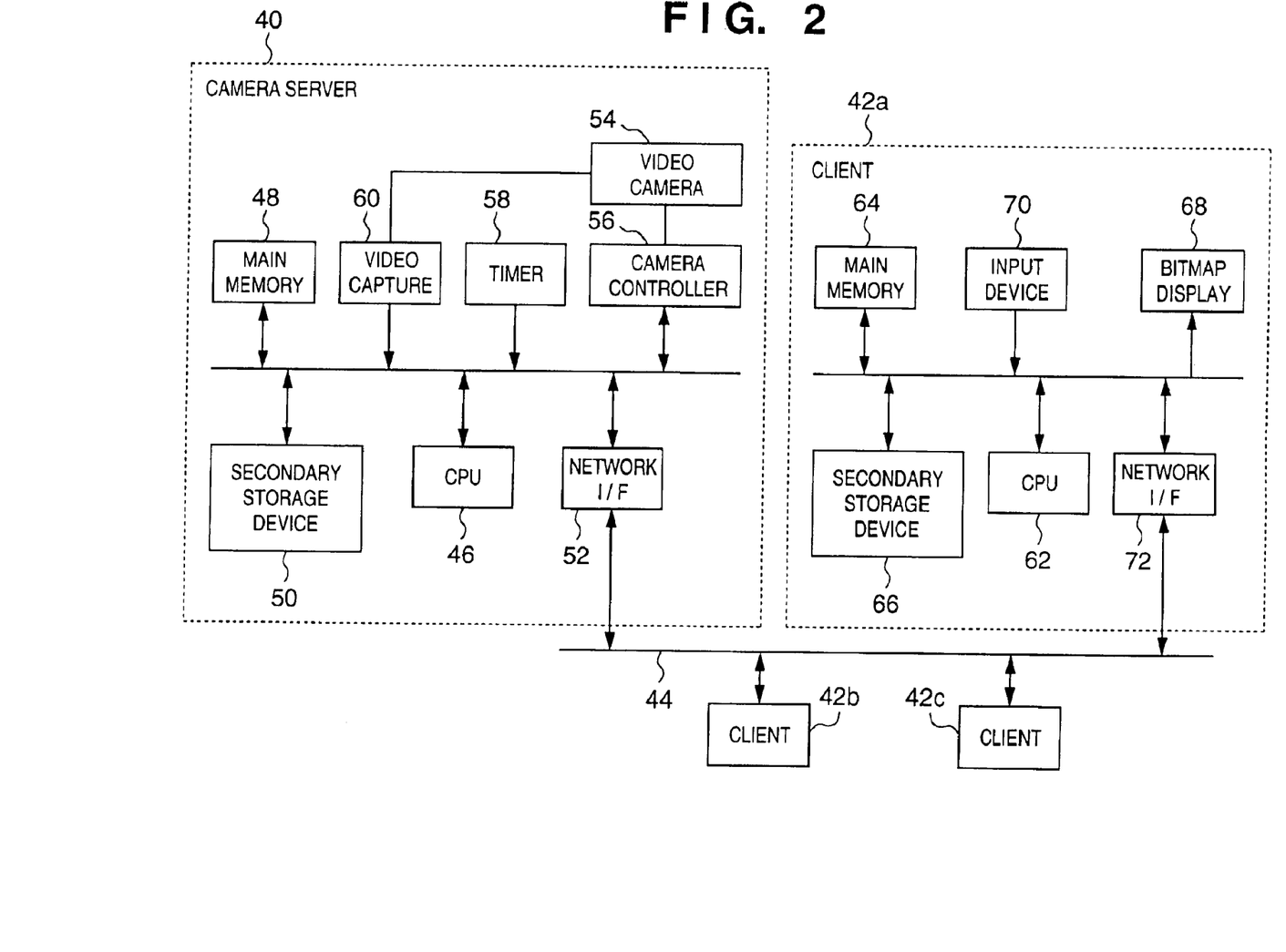
FIG. 2 is a block diagram illustrating a configuration of an image down-loading system according to the first embodiment of the present invention.

FIG. 2 is a block diagram illustrating a configuration of an image down-loading system according to the first embodiment of the present invention. In FIG. 2, reference numeral 40 denotes a camera server; and 42a, 42b, and 42c, client devices (simply referred to as "client" hereinafter) capable of remote-controlling the camera server 40 via a network 44.

The camera server 40 has a CPU 46, main memory 48, secondary storage device 50, a network interface 52, a video camera 54, a camera controller 56 for controlling the camera 54, a timer 58, and a video capture 60 for capturing an image signal outputted from the video camera 46. The camera controller 56 controls the image sensing direction (i.e., panning and tilting) and magnification ratio (i.e., zooming) of the camera 54. The secondary storage device 50 stores a control program executed by the CPU 46, image information of advertisement which is inserted between images sensed by the camera 54, and so on. Namely, the secondary storage device 50 corresponds to the image server 22 in FIG. 1. The CPU 46 switches between an image sensed by the camera 54 and an image of advertisement stored in the secondary storage device 50 at predetermined intervals by referring to the timer 58. Namely, the CPU 46 functions as the switch 24 in FIG. 1.

The video capture 60 receives a signal conforming to the NTSC (National Television System Committee) standard from the camera 54, performs analog/digital conversion on the signal, compresses the signal, then provides it to the network interface 52. As for the image compression method, there are motion JPEG (Joint Photographic Experts Group), and MPEG (Moving Picture Image Coding Experts Group) methods; however, the method is not limited to these in the present invention.

The CPU 46 of the camera server 40 captures an image signal outputted from the camera 54 using the video capture 60, and down-loads it to the client 42a, 42b, or 42c, which requested the image, via the network 44. Further, when the CPU 46 accepts a camera control command from the client 42a, 42b, or 42c authorized to control the camera 54 (camera control authorization), it controls the camera 54 using the camera controller 56.

In FIG. 2, an internal configuration of the client 42a is shown, and the clients 42b and 42c have the same configuration as the client 42a. More specifically, each of the clients 42a, 42b, and 42c has a CPU 62, main memory 64, a secondary storage device 66, a bitmap display 68, an input device 70, such as a keyboard and mouse, and a network interface 72. The clients 42a, 42b, and 42c respectively request the camera server 40 to transmit an image, receive compressed image data, expand the compressed image data, and display the image on the bitmap display 68.

Figure 3:
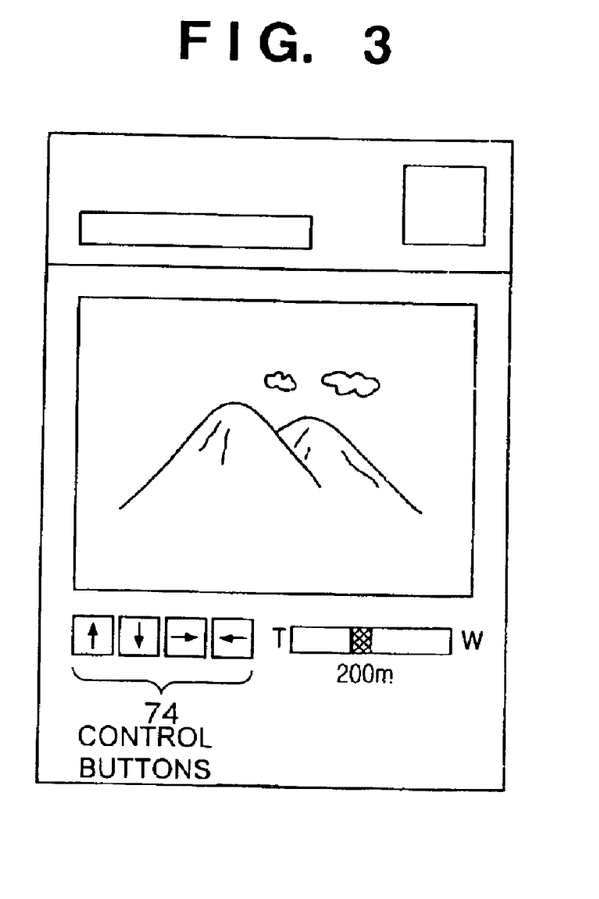
FIG. 3 shows an example of an image displayed on a display screen of a client device having authorization to control camera.

Further, when any of the clients 42a, 42b, and 42c outputs a request for camera control authorization to the camera server 40, and receives the authorization, it is possible for the authorized client to remote-control the camera 54. Note that the camera control authorization is administrated so that only one client 42a, 42b, or 42c can have the authorization at a time. On the display screen of the client 42a, 42b, or 42c which obtained the camera control authorization, control buttons 74 for controlling panning, tilting, and zooming of the camera 54 are displayed along with an image, as shown in FIG. 3. The client 42a, 42b, or 42c having the camera control authorization can remote-control the camera 54 by operating the buttons 74.

Figure 4:
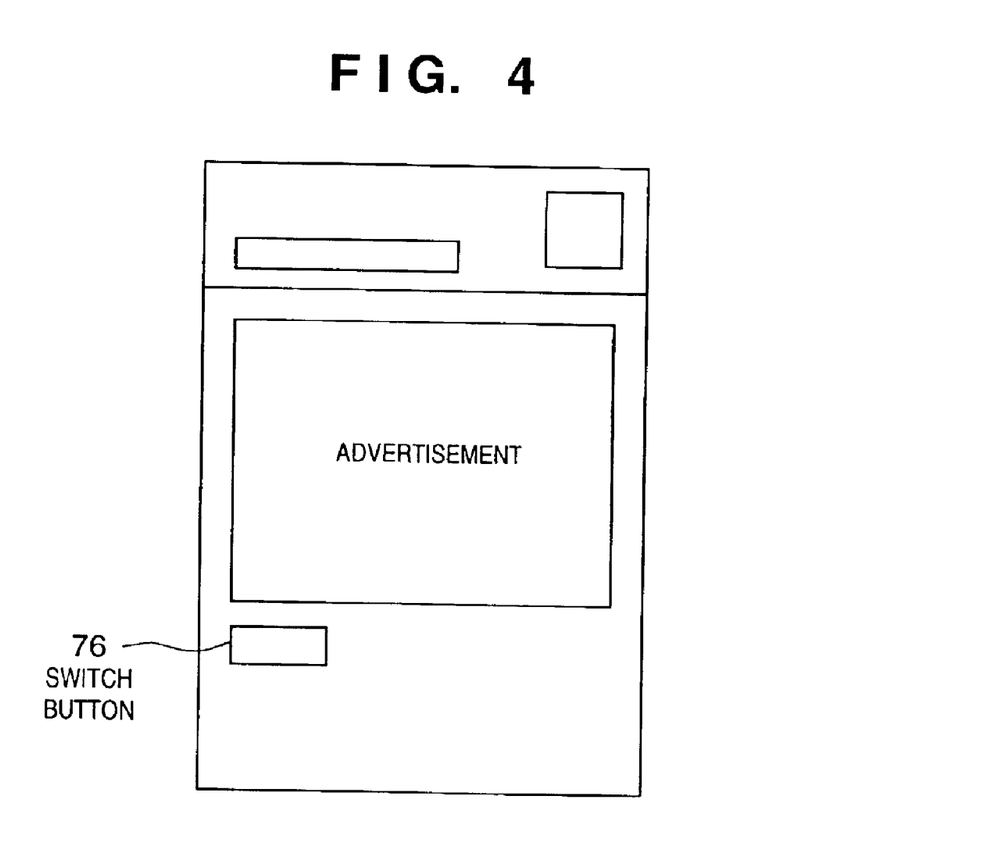
FIG. 4 shows an example of a display screen of the client device when advertisement is displayed.

According to the first embodiment as described above, advertisement is displayed between images sensed by the camera 54 at predetermined intervals. In such a case, the period of the advertisement may be too long or too short depending upon a user. Accordingly, it is preferable to configure the system so that the period for down-loading the advertisement is set long in default, and the user can switch to an image sensed by the camera 54 after the advertisement is down-loaded, after a predetermined period. To realize this configuration, a switch button 76 is provided along with advertisement image, as shown in FIG. 4. The switch button 76 is activated after a predetermined time has elapsed since the advertisement started to be displayed. When the user operates the activated switch button 76, the client 42a, 42b, or 42c outputs a request to the camera server 40 to transmit an image sensed by the camera 54. In response to the request, the camera server 40 down-loads an image sensed by the camera 54 via the network 44 instead of the advertisement stored in the secondary storage device 50.

Figure 6:
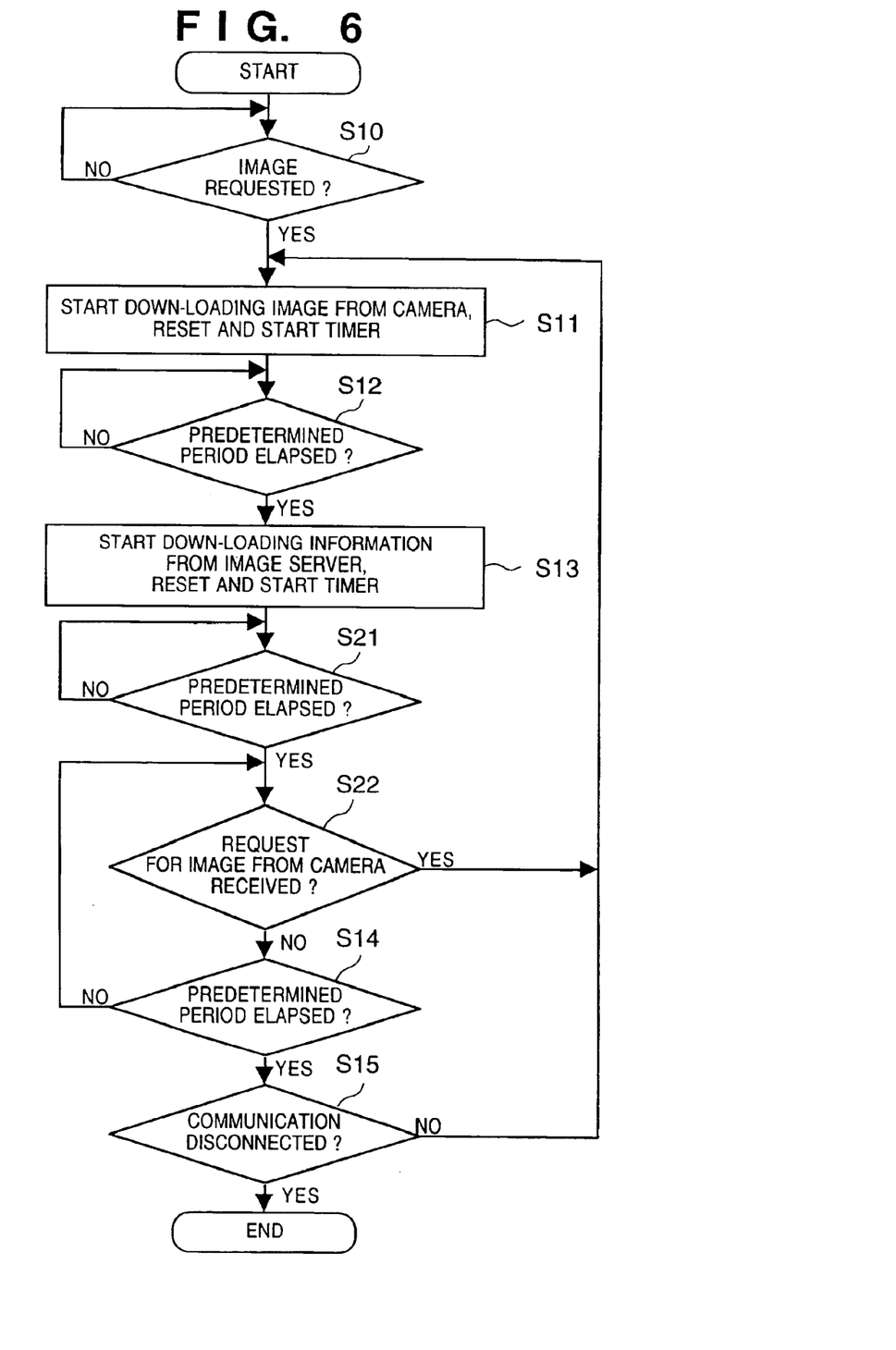
FIG. 6 is a flowchart for explaining another operation of the web server according to the first embodiment of the present invention.

FIG. 6 is a flowchart showing a processing sequence of the aforesaid operation performed by the web server 26 (or the camera server 40). Note, in FIG. 6, the same processes as those in FIG. 5 are referred to by the same step numbers, and explanations of those are omitted. FIG. 6 differs from FIG. 5 in the processes subsequent to step S13 in which information (e.g., advertisement) from to the image server 22 starts to be down-loaded.

In step S13, the down-loading of advertisement starts and the timer 40 is reset and started, then the process proceeds to step S21. In step S21, whether or not a predetermined period has passed is determined, and after the predetermined period has elapsed, the process proceeds to step S22. In step S22, whether a request, designated by operating the switch button 76, for an image sensed by the camera 20 from the terminal 30 (client 42a, 42b, or 42c) is received or not is determined. If yes, then the process returns to step S11, and the image sensed by the camera 20 starts to down-load to the terminal 30.

Whereas, if no request is received in step S22, then the process proceeds to step S14 and whether or not a predetermined period has elapsed or not is determined. Note that, since the predetermined period to be determined in step S14 includes the predetermined period determined in step S21, the period to be determined in step S14 is longer than the period determined in step S21. If the predetermined period has not elapsed, the process returns to step S22, and the process of checking whether or not a request for down-loading the image sensed by the camera 20 is received is repeated until the predetermined period elapses.

After the predetermined period has passed in step S14, then the process proceeds to step S15, and if the communication line is disconnected, the process is completed, whereas if still connected, then steps S11 to S15 are repeated.

Note, when a plurality of terminals, e.g., the clients 42a, 42b, and 42c, access the web server 26 (camera server 40), they usually access the server 26 (40) at different times. Therefore, in a case of down-loading an image sensed by the camera 20 while inserting advertisement in the aforesaid manner, the switching between the camera image and the advertisement is performed at different times, since the time when the camera server 40 starts down-loading the image from the camera 20 differs from one client to another.

In the first embodiment as described above, an image sensed by the camera 20 and information, such as advertisement, from the image server 22 are alternatively down-loaded; however, the present invention is not limited to this. For instance, it is possible to provide a recorded moving image by reading out the image instead of a live image, and an image or information, such as characters, which is independent of the moving image may be inserted instead of advertisement while providing the moving image. In short, information which is independent of a moving image is inserted into the moving image so that the moving image can not be plagiarized.

According to the embodiment as described above, since information other than a moving image, such as a live image, is inserted into the moving image while down-loading the moving image; therefore, it is possible to prevent the moving image from being plagiarized.

Second Embodiment

The second embodiment is described below.

An image down-loading system according to the second embodiment is the same as that described in the first embodiment with reference to FIGS. 1 and 2; thus explanation of it is omitted.

In the first embodiment, an image sensed by the camera 20 and information, such as advertisement, from the image server 22 are alternately down-loaded at predetermined intervals. However, there is a case where a client which belongs to the same party providing the image sensed by the camera 20 requests the image, for instance, and in such a case, it is not necessary to down-load the advertisement.

Accordingly, in the second embodiment, the camera server 40 (web server 26) registers information (e.g., client ID) of a client or clients to which an image sensed by the camera 54 (20) should be provided while inserting advertisement for a shorter period, comparing to the first embodiment, or without advertisement, in the main memory 48 or the secondary storage device 50 and makes a list of the registered clients, and alters the period to down-load the advertisement depending upon the client.

An operation of the camera server 40, or the web server 26, according to the second embodiment is explained with reference to a flowchart in FIG. 7. In the following explanation, an image sensed by the camera 54, or 20, is referred to as "image", and information provided from the image server 22 is referred to as "advertisement".

First, the camera server 40 waits for a request for an image from a client in step S30. When a request is received, the process proceeds to step S31 and the camera server 40 checks the client ID of the client requesting the image, and determines whether or not the client ID is on the list or not. If the client ID is on the list (YES in step S31), then the process proceeds to step S32 and the period for down-loading an image is set to t1, further, in step S34, the period for transferring advertisement is set to t3. If the client ID is not on the list (NO in step S31), then the process proceeds to step S33 and the period for transferring an image is set to t2, further, in step S35, the period for transferring advertisement is set to t4. Here, t3 is set shorter than t4, thereby it is possible to shorten the period for down-loading the advertisement if the client ID is on the list. Note, the periods t1 and t2 may be set to the same, or the period t1 may be set longer than the period t2. In the latter case, it is possible to down-load the image for a longer period to the registered client than to the non-registered client.

Figure 7:
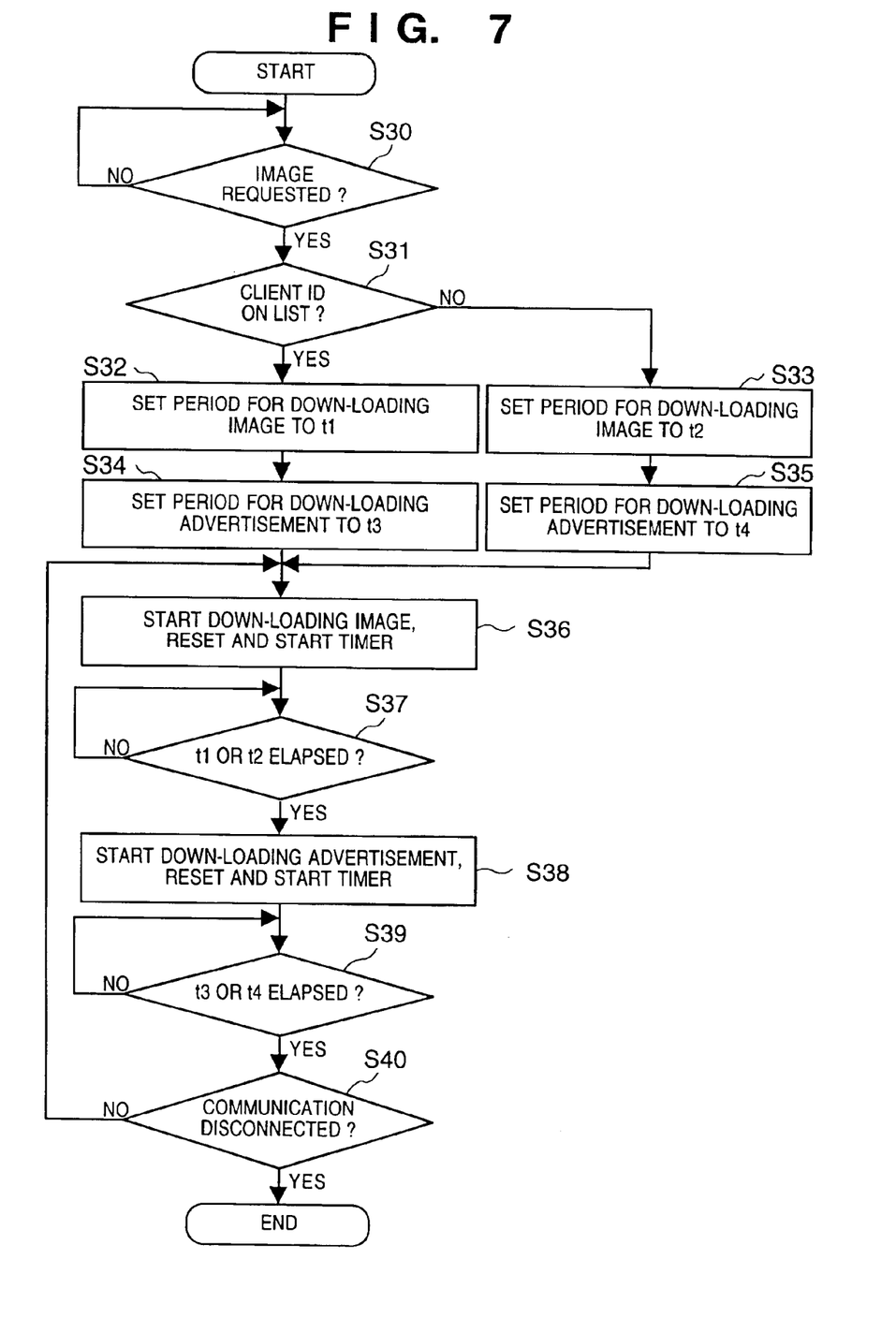
FIG. 7 is a flowchart for explaining an operation of a web server according to a second embodiment of the present invention.
Figure 8:
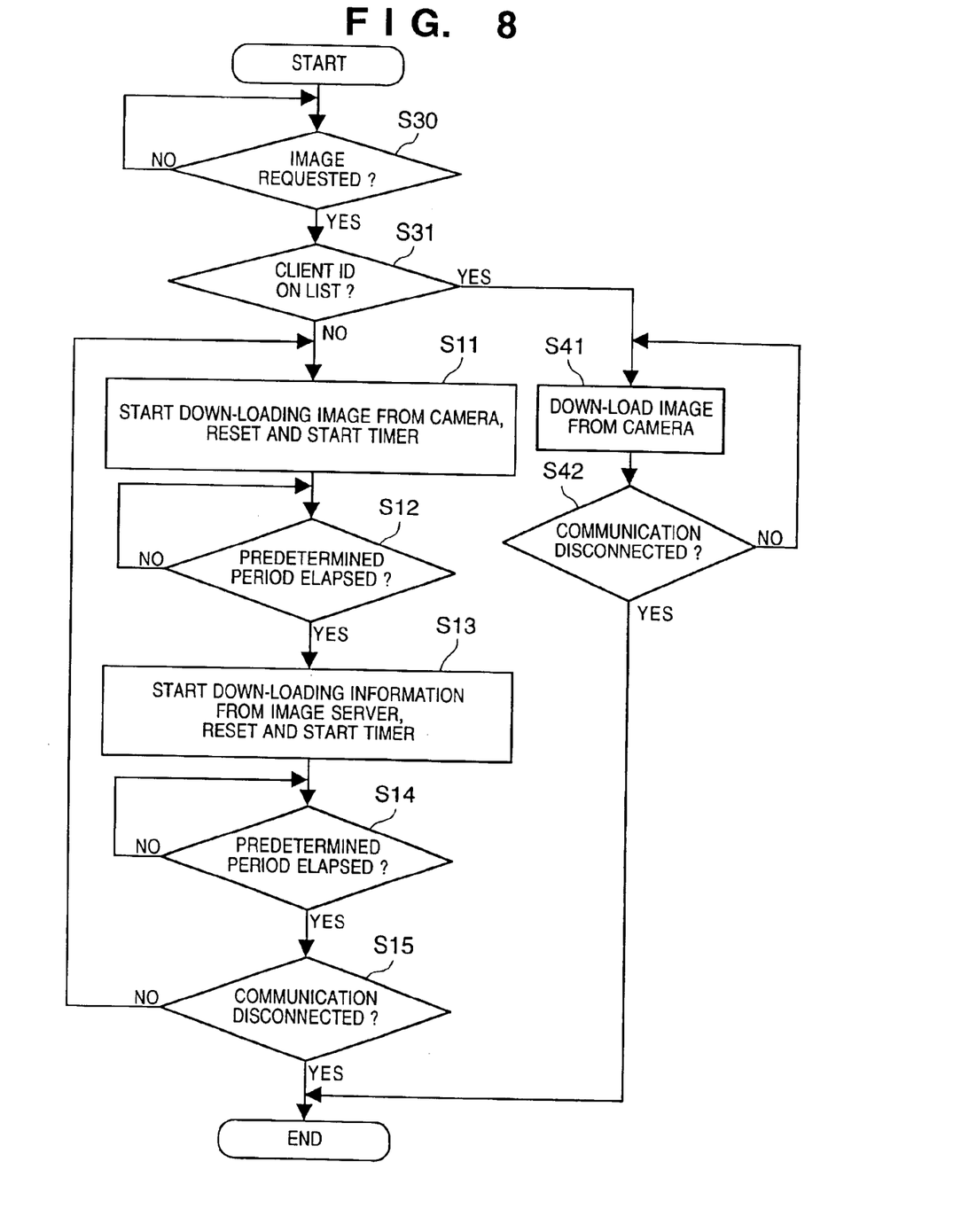
FIG. 8 is a flowchart for explaining another operation of the web server according to the second embodiment of the present invention.

In the flowchart in FIG. 7, a method for shortening the period for down-loading advertisement to a registered client is described; however, as shown in FIG. 8, it is possible to control to down-load only an image to the registered client in the loop of steps S41 and S42, and to perform the processes subsequent to steps S11 if the client is not registered. Note, the steps S11 to S15 are the same as those explained with reference to FIG. 5; therefore, explanation of them are omitted.

To register a client ID in the camera server 40, a client sends a request for registration to the camera server 40, and the camera server 40 registers the client ID in response to the request. The camera server 40 may determine whether to permit the registration of the client or not in accordance with a predetermined rule or rules, and register the client ID when the camera server 40 permits the registration. In this case, it is possible to control the registration of a client or clients connected to a predetermined network, or use a password, for instance.

Further, an administrator of the camera server 40 may manually register a client ID.

In the case of using a password, instead of registering client IDs in the camera server 40, the camera server 40 inquires for a password to a client, and when the correct password is entered, the camera server 40 may control to shorten or eliminate the period for down-loading advertisement.

Further, it is possible to control the down-loading of the image and advertisement by further distinguishing between a client to which a period of advertisement is to be shortened and a client to which only an image is down-loaded without advertisement.

In the second embodiment as described above, an image sensed by the camera 20 (54) and information, such as advertisement, from the image server 22 are alternatively down-loaded; however, the present invention is not limited to this. For instance, it is possible to provide a recorded moving image by reading out the image instead of a live image, and an image or information, such as characters, which is independent of the moving image may be inserted instead of advertisement while providing the moving image. In short, information which is independent of a moving image is inserted into the moving image so that the moving image can not be plagiarized. Further, it is possible to shorten or even eliminate the period for down-loading the information inserted into the moving image when down-loading the moving image to a registered client.

As described above with reference to FIG. 2, the object of the present invention can be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the-storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image down-loading apparatus capable of down-loading an image to a plurality of clients via internet, comprising:

a switch adapted to switch between a first output device which outputs an image and a second output device which outputs an advertisement that is different from an image picked up by a connected camera; and a switch controller adapted to control said switch so as to select said first output device after said second output device is selected for a first predetermined period and to make a request for delivering the image output from said first output device effective after a second predetermined period, which is shorter than the first predetermined period, has elapsed since the start of down-loading the advertisement, wherein, when the request is received during said second output device is selected, said switch controller controls said switch to switch to said first output device even if the first predetermined period has not elapsed.

2. The image down-loading apparatus according to claim 1, wherein the clients are classified into a plurality of groups, and the image down-loading apparatus further comprises a discrimination unit adapted to discriminate a group to which a client belongs, wherein said switch controller controls said switch so as to make the first predetermined period shorter for a client which belongs to a first group than for a client which belongs to a second group.

3. The image down-loading apparatus according to claim 2, further comprising memory for storing advertisement on clients, wherein said discrimination unit discriminates a client as belonging to the first group when the advertisement on the client is stored in said memory, and discriminates a client as belonging to the second group when the advertisement on the client is not stored in said memory.

4. The image down-loading apparatus according to claim 2, wherein said discrimination unit discriminates a client as belonging to the first group when the client enters a correct password, and discriminates a client as belonging to the second group otherwise.

5. The image down-loading apparatus according to claim 1, wherein the clients are classified into a plurality of groups, and the image down-loading apparatus further comprises discrimination unit for discriminating a group to which a client belongs, wherein said switch controller controls said switch so as to keep selecting said first output device for a client which belongs to a first group.

6. The image down-loading apparatus according to claim 5, further comprising memory for storing advertisement on clients, wherein said discrimination unit discriminates a client as belonging to the first group when the advertisement on the client is stored in said memory, and discriminates a client as belonging to a second group when the advertisement on the client is not stored in said memory.

7. The image down-loading apparatus according to claim 5, wherein said discrimination unit discriminates a client as belonging to the first group when the client enters a correct password, and discriminates a client as belonging to the second group otherwise.

8. The image down-loading apparatus according to claim 1, wherein the clients are classified into a plurality of groups, and the image down-loading apparatus further comprises a discrimination unit adapted to discriminate a group to which a client belongs, wherein said switch controller controls said switch so as to keep selecting said first output device for a client which belongs to a first group, and to make the first predetermined period shorter for a client which belongs to a second group than for a client which belongs to a third group.

9. The image down-loading apparatus according to claim 1, wherein the image outputted by said first output device is a moving image.

10. The image down-loading apparatus according to claim 9, wherein the image outputted by said first output device is an image being sensed by a video camera.

11. The image down-loading apparatus according to claim 1, further comprising memory for storing advertisement, wherein the advertisement to be outputted by said second output device is the advertisement stored in said memory.

12. An image down-loading system capable of down-loading an image to a plurality of clients via internet, comprising:

a first down-loading device which down-loads an image;

a second down-loading device which down-loads an advertisement that is different from an image picked up by a connected camera;

a switch adapted to switch between said first down-loading device and said second down-loading device; and a switch controller adapted to control said switch so as to select said first down-loading device after said second down-loading device is selected for a first predetermined period and to make a request for delivering the image output from said first down-loading device effective after a second predetermined period, which is shorter than the first predetermined period, has elapsed since the start of down-loading the advertisement, wherein, when the request is received during said second down-loading device is selected, said switch controller controls said switch to switch to said first down-loading device even if the first predetermined period has not elapsed.

13. The image down-loading system according to claim 12, wherein the clients have memory for storing the advertisement down-loaded by said second down-loading device, and while said switch selects said second down-loading device, the clients display the advertisement stored in said memory.

14. The image down-loading system according to claim 12, wherein the clients have memory for storing the advertisement down-loaded by said second down-loading device, and since a communication path is established on the internet until the image to be down-loaded by said first down-loading device starts to be down-loaded, the clients display the advertisement stored in said memory.

15. The image down-loading system according to claim 12, wherein the clients have memory for storing the advertisement down-loaded by said second down-loading device, and after a communication path on the Internet is disconnected, the clients display the advertisement stored in said memory.

16. The image down-loading system according to claim 12, wherein the clients are classified into a plurality of groups, and the image down-loading system further comprises a discrimination unit adapted to discriminate a group to which a client belongs, wherein said switch controller controls said switch so as to make the first predetermined period shorter for a client which belongs to a first group than for a client which belongs to a second group.

17. The image down-loading system according to claim 16, further comprising memory for storing advertisement on clients, wherein said discrimination unit discriminates a client as belonging to the first group when the advertisement on the client is stored in said memory, and discriminates a client as belonging to the second group when the advertisement on the client is not stored in said memory.

18. The image down-loading system according to claim 16, wherein said discrimination unit discriminates a client as belonging to the first group when the client enters a correct password, and discriminates a client as belonging to the second group otherwise.

19. The image down-loading system according to claim 12, wherein the clients are classified into a plurality of groups, and the image down-loading system further comprises a discrimination unit adapted to discriminate a group to which a client belongs, wherein said switch controller controls said switch so as to keep selecting said first down-loading device for a client which belongs to a first group.

20. The image down-loading system according to claim 19, further comprising memory for storing advertisement on clients, wherein said discrimination unit discriminates a client as belonging to the first group when the advertisement on the client is stored in said memory, and discriminates a client as belonging to a second group when the advertisement on the client is not stored in said memory.

21. The image down-loading system according to claim 19, wherein said discrimination unit discriminates a client as belonging to the first group when the client enters a correct password, and discriminates a client as belonging to the second group otherwise.

22. The image down-loading system according to claim 12, wherein the clients are classified into a plurality of groups, and the image down-loading system further comprises a discrimination unit adapted to discriminate a group to which a client belongs, wherein said switch controller controls said switch so as to keep selecting said first down-loading device for a client which belongs to a first group, and to make the first predetermined period shorter for a client which belongs to a second group than for a client which belongs to a third group.

23. The image down-loading system according to claim 12, wherein the image down-loaded by said first down-loading device is a moving image.

24. The image down-loading system according to claim 23, wherein the image down-loaded by said first down-loading device is an image being sensed by a video camera.

25. The image down-loading system according to claim 12, further comprising memory for storing advertisement, wherein the advertisement to be down-loaded by said second down-loading device is the advertisement stored in said memory.

26. An image down-loading method capable of down-loading an image to a plurality of clients via internet, comprising:
a first down-loading step of down-loading an image;
a second down-loading step of down-loading an advertisement that is different from the down-loaded in said first down-loading step; and
a switching step of switching from said second down-loading step to said first down-loading step after a first predetermined period has elapsed;
a control step of making a request for initiating said second down-loading step effective after a second predetermined period, which is shorter than the first predetermined period, has elapsed since the start of down-loading the advertisement
wherein, when the request is received during said first down-loading step, control of switching to said second down-loading step is performed even if the first predetermined period has not elapsed.

27. The image down-loading method according to claim 26, further comprising:
a step of causing a client to store said advertisement down-loaded in said second down-loading step; and
a step of causing the client to display the stored advertisement for a period corresponding to said second down-loading step.

28. The image down-loading method according to claim 26, further comprising:
a step of causing a client to store the advertisement down-loaded in said second down-loading step; and
a step of displaying the stored advertisement for a period since a communication path is established on the internet until the image to be down-loaded in said first down-loading step starts to be down-loaded.

29. The image down-loading method according to claim 26, further comprising:
a step of causing a client to store the advertisement down-loaded in said second down-loading step; and
a step of displaying the stored advertisement after communication path on the internet is disconnected.

30. The image down-loading method according to claim 26, wherein the clients are classified into a plurality of groups, and the method further comprises a discrimination step of discriminating a group to which a client belongs,
wherein the first predetermined period is shorter for a client which belongs to a first group than for a client which belongs to a second group.

31. The image down-loading method according to claim 30, wherein, in said discrimination step, whether or not a client is a registered client, the registered client is discriminated to belong to the first group and a non-registered client is discriminated to belong to the second group.

32. The image down-loading method according to claim 30, wherein, in said discrimination step, a client who enters a correct password is discriminated to belong to the first group, and other clients are discriminated to belong to the second group.

33. The image down-loading method according to claim 26, wherein the clients are classified into a plurality of groups, and the method further comprises a discrimination step of discriminating a group to which a client belongs,
wherein said second down-loading step and said first switching step are disabled for a client which belongs to a first group.

34. The image down-loading method according to claim 33, wherein, in said discrimination step, whether or not a client is a registered client, the registered client is discriminated to belong to the first group and a non-registered client is discriminated to belong to the second group.

35. The image down-loading method according to claim 33, wherein, in said discrimination step, a client who enters a correct password is discriminated to belong to the first group, and other clients are discriminated to belong to the second group.

36. The image down-loading method according to claim 26, wherein the clients are classified into a plurality of groups, and the method further comprises a discrimination step of discriminating a group to which a client belongs,
wherein said second down-loading step and said switching step are disabled for client which belongs to a first group, and the first predetermined period is shorter for a client which belongs to a second group than for a client which belongs to a third group.

37. The image down-loading method according to claim 26, wherein the image down-loaded in said first down-loading step is moving image.

38. The image down-loading method according to claim 37, wherein the image down-loaded in said first down-loading step is an image being sensed by a video camera.

39. The image down-loading method according to claim 26, wherein, in said second down-loading step, advertisement stored in memory in advance is down-loaded.

40. A computer program product comprising a computer usable medium having computer readable program code means embodied in said medium for down-loading an image to a plurality of clients via internet, said product including:
first computer readable program code means for down-loading an image;
second computer readable program code means for down-loading an advertisement that is different from the image down-loaded by said first computer readable program code means;
third computer readable program code means for switching from said second computer readable program code means to said first computer readable program code means after a first predetermined period has elapsed; and
fourth computer readable program code means for making a request for initiating said second down-loading step effective after a second predetermined period which is shorter than the first predetermined period, has elapsed since the start of down-loading the advertisement,
wherein, when the request is received during said first down-loading step, control of switching to said second down-loading step is performed even if the first predetermined period has not elapsed.

41. The computer program product according to claim 40, further comprising:
fifth computer readable program code means for causing a client to store the advertisement; and
sixth computer readable program code means for causing the client to display the stored advertisement for a period corresponding to a period during which said second computer readable program code means is to be activated.

42. The computer program product according to claim 40, further comprising:

seventh computer readable program code means for causing a client to store the advertisement; and eighth computer readable program code means for displaying the stored advertisement for a period since a communication path is established on the internet until the image starts to be down-loaded.

43. The computer program product according to claim 40, further comprising:

ninth computer readable program code means for causing a client to store the advertisement; and tenth computer readable program code means for displaying the stored advertisement after a communication path on the internet is disconnected.

44. The computer program product according to claim 40, wherein the clients are classified into a plurality of groups, and the product further comprises thirteenth computer readable program code means for discriminating a group to which a client belongs, wherein the first predetermined period is shorter for a client which belongs to a first group than for a client which belongs to a second group.

45. The computer program product according to claim 40, wherein the clients are classified into a plurality of groups, and the product further comprises fourteenth computer readable program code means for discriminating a group to which a client belongs, wherein said second and third computer readable program code means is disabled for a client which belongs to a first group.

46. The computer program product according to claim 40, wherein the clients are classified into a plurality of groups, and the product further comprises fifteenth computer readable program code means for discriminating a group to which a client belongs, wherein said second and third computer readable program code means is disabled for a client which belongs to a first group, and the first predetermined period is shorter for a client which belongs to a second group than for a client which belongs to a third group.

47. An image receiving apparatus receiving an image picked up by a connected camera and advertisement that is different from the image, from an image providing apparatus, comprising:

a receiving device adapted to receive the image picked up by the connected camera and the advertisement being received in advance of the image; and a memory control device adapted to control to store the received advertisement in a memory; and a display control device adapted to execute a display of the advertisement which is stored in the memory in advance until the image picked up by the connected camera is provided, and to switch the display of the advertisement to a display of the image picked up by the connected camera in response to receiving of the image picked up by the connected camera.

48. A display method in an image receiving apparatus receiving an image picked up by a connected camera and advertisement that is different from the image from an image providing apparatus, comprising:

receiving and storing the advertisement in a memory in response to accessing he connected camera;

displaying the advertisement which is stored in the memory in advance until the image picked up by the connected camera is provided; and switching the display of the advertisement to a display of the image picked up by the connected camera in response to receiving of the image picked up by the connected camera.

49. A computer program product comprising a computer usable medium having computer readable program to execute a displaying method in an image receiving apparatus receiving an image picked up by a connected camera and advertisement that is different from the image from an image providing apparatus, said computer readable program executing:

receiving and storing the advertisement in a memory in response to accessing the connected camera;

displaying the advertisement which is stored in the memory in advance until the image picked up by the connected camera is provided; and switching the display of the advertisement to a display of the image picked up by the connected camera in response to receiving of the image picked up by the connected camera.

50. An image down-loading apparatus capable of down-loading an image to a plurality of clients via internet, comprising:

a switch adapted to switch between a first output device which outputs a moving image and a second output device which outputs an image which is independent of the moving image output from said first output device;

a switch controller adapted to control said switch, in response to a request for the moving image from any of said plurality of clients, to temporarily switch to the image output from said second output device at a predetermined interval while down-loading the requested moving image; and a down-loading unit adapted to down-load an image from said switch.

51. An image down-loading method capable of down-loading via internet to a plurality of clients moving image output by a first output device and an image, output from a second output device, which is independent of the moving image output from said first output device, comprising:

receiving a request for the moving image from any of said plurality of clients;

controlling, in response to the request, to temporarily select the image output from said second output device at a predetermined interval while down-loading the requested moving image; and a down-loading the requested moving image and the temporarily selected image output from said second output device in response to the request.

* * * * *

UNITED STATES PATENT AND TRADEMARK OFFICE
CERTIFICATE OF CORRECTION

PATENT NO. : 6,880,169 B1
DATED : April 12, 2005
INVENTOR(S) : Watanabe et al.

It is certified that error appears in the above-identified patent and that said Letters Patent is hereby corrected as shown below:

<u>Title page,</u>
Item [56], References Cited, U.S. PATENT DOCUMENTS, change the name of "Houpt et al." for cited reference US Patent Document 5,732,216 to -- Logan et al. --;

<u>Column 11,</u>
Line 1, change "down-loaded" to -- image down-loaded --;

<u>Column 12,</u>
Line 1, delete the word "first"; and

<u>Column 14,</u>
Line 2, change the word "he" to -- the --.

Signed and Sealed this

First Day of November, 2005

JON W. DUDAS
*Director of the United States Patent and Trademark Office*